United States Patent [19]

Tanaka et al.

[11] Patent Number: 4,617,344

[45] Date of Patent: Oct. 14, 1986

[54] ALKYL PHOSPHONATE ESTER-MODIFIED ORGANOPOLYSILOXANE LATEX AND A METHOD FOR THE PREPARATION THEREOF

[75] Inventors: Masaki Tanaka; Hiroshi Ohashi, both of Gunma, Japan

[73] Assignee: Shin-Etsu Chemical Co., Ltd., Tokyo, Japan

[21] Appl. No.: 732,239

[22] Filed: May 8, 1985

[30] Foreign Application Priority Data

May 22, 1984 [JP] Japan ................................ 59-103383

[51] Int. Cl.$^4$ ............................................. C08L 83/00
[52] U.S. Cl. ..................................... 524/837; 524/588; 524/858; 524/859; 524/860; 528/23; 528/30; 528/34; 528/37
[58] Field of Search ............... 524/588, 837, 858, 859, 524/860; 528/23, 30, 34, 37

[56] References Cited

U.S. PATENT DOCUMENTS 4,448,927  5/1984  Falender et al. ................. 528/23
4,482,670  11/1984  Saam et al. ....................... 528/23

Primary Examiner—Melvyn I. Marquis
Attorney, Agent, or Firm—Toren, McGeady, Stanger, Goldberg & Kiel

[57] ABSTRACT

The organopolysiloxane in the inventive latex is modified with phosphonate ester-containing groups such as those expressed by the formula —Si—CH$_2$CH$_2$—PO(OEt)$_2$ (Et: ethyl group) and —Si—CH$_2$CH$_2$—PO(ODd)$_2$ (Dd: dodecyl group) and exhibits excellent performance in the applications as a fabric treatment agent and the like. The inventive organopolysiloxane latex can be prepared by the polymerizing reaction of an organosilicon compound or, preferably, an organopolysiloxane and a phosphonate ester-modified alkoxysilane emulsified together in an aqueous medium containing a surface active agent of the class of the organic sulfonic acid type or a sulfate ester type ones which serves both as an emulsifier and as an acid catalyst.

4 Claims, No Drawings

ALKYL PHOSPHONATE ESTER-MODIFIED ORGANOPOLYSILOXANE LATEX AND A METHOD FOR THE PREPARATION THEREOF

BACKGROUND OF THE INVENTION

The present invention relates to a novel organopolysiloxane latex having excellent self-crosslinkability and film-formability or, more particularly, to a novel alkyl phosphonate ester-modified organopolysiloxane latex useful as a fabric treatment agent, lubricant, mold-release agent, glass fiber treatment agent, lustering agent and the like as well as a method for the preparation of the same.

There are known several methods in the prior art for the preparation of an organopolysiloxane latex, i.e. a stable aqueous emulsion of an organopolysiloxane, including a method in which emulsion polymerization of an organopolysiloxane in an aqueous medium is performed in the presence of a strong acid or strong alkali (see, for example, Japanese Patent Publication No. 34-2041) and a method in which emulsion polymerization of a low-molecular cyclic organopolysiloxane is performed in the presence of a trialkoxysilane having a functional group such as an amino, epoxy and the like to introduce the functional groups into the organopolysiloxane in the latex (see, for example, Japanese Patent Publication No. 56-38609).

The organopolysiloxane latexes obtained by these methods, however, are not always quite satisfactory in respect of their properties, in particular, with insufficient reactivity. When the amount of the trialkoxysilane is increased in the latter method, a latex composition having self-crosslinkability can be obtained although the degree of the self-crosslinkability can hardly be satisfactory for practical purposes. Moreover, the organopolysiloxane latexes prepared by this method are sometimes not free from a very serious problem of the formation of undesirable gelled matter by the reaction of the functional groups such as the epoxy groups or hydrolysis and silanol condensation of the alkoxy groups.

SUMMARY OF THE INVENTION

It is therefore an object of the present invention to provide an organopolysiloxane latex having excellent self-crosslinkability and film-formability and free from the above described problems in the prior art latexes containing an organopolysiloxane.

Another object of the invention is to provide a method for the preparation of an organopolysiloxane latex satisfying the above mentioned requirements.

Thus, the method for the preparation of an organopolysiloxane latex mentioned above comprises: emulsion-polymerizing (a) 100 parts by weight of an organosilicon compound represented by the general formula $$R^1{}_a R^2{}_b SiO_{(4-a-b)/2}, \quad (I)$$

in which $R^1$ is a group selected from the class consisting of substituted and unsubstituted monovalent hydrocarbon groups having from 1 to 20 carbon atoms, $R^2$ is an alkoxy group or a hydroxy group, each of the groups denoted by $R^1$ or $R^2$ in a molecule being independent from the others, a is a positive number not exceeding 3 and b is zero or a positive number not exceeding 3 with the proviso that a+b is in the range from 1 to 4 inclusive, and (b) from 0.1 to 30 parts by weight of an alkyl phosphonate ester-modified alkoxy silane represented by the general formula $$(R^3O)_{3-c}R^3{}_cSi-R^4-PO(OR^3)_2, \quad (II)$$

in which $R^3$ is a substituted or unsubstituted monovalent hydrocarbon group or, in particular, alkyl group having from 1 to 20 carbon atoms, each of the groups denoted by $R^3$ in a molecule being independent from the others, $R^4$ is a divalent hydrocarbon group having from 1 to 8 carbon atoms and c is zero, 1 or 2, in an aqueous medium containing (c) a surface active agent selected from the class consisting of those of the sulfonic acid type and those of the sulfate ester type.

Although the chemical structure is not quite clearly understood, accordingly, the alkyl phosphonate-modified organopolysiloxane in the inventive organopolysiloxane latex may have a modifying group of the formula $-Si-R^4-PO(OR^3)_2$ bonded to the silicon atom in the reactant (a) above through a siloxane linkage Si-O-Si.

DETAILED DESCRIPTION OF THE PREFERRED EMBODIMENTS

As is understood from the above description, the scope of the inventive method consists in the emulsion polymerization of the organosilicon compound as the reactant (a) and the phosphonate ester-modified organosilane compound as the reactant (b) in an aqueous medium containing the sepcific surface active agent.

The reactant (a) represented by the general formula (I) is an organosilane compound when a+b is 4 or an organopolysiloxane compound when a+b is smaller than 4. When it is an organopolysiloxane, the molecular configuration thereof is not particularly limitative including linear chain structures, branched chain structures and cyclic structures. The group denoted by $R^1$ in the general formula (I) is a monovalent hydrocarbon group having from 1 to 20 carbon atoms exemplified by alkyl groups such as methyl, ethyl, propyl, butyl, octyl and dodecyl groups, cycloalkyl groups such as cyclohexyl group, alkenyl groups such as vinyl and allyl groups, aryl groups such as phenyl and naphthyl groups and aralkyl groups such as tolyl and xylyl groups as well as those substituted groups obtained by the substitution of substituents such as halogen atoms, cyano groups and the like for all or a part of the hydrogen atoms in the above named hydrocarbon groups. The group denoted by $R^2$ is an alkoxy group such as methoxy, ethoxy, propoxy and butoxy groups or a hydroxy group, which, when the component (a) is an organopolysiloxane, may be bonded to the silicon atom at any position of the siloxane chain of the molecular structure.

Several of the particular examples of the organosilicon compound suitable as the reactant (a) include organopolysiloxanes exemplified by: a dimethylpolysiloxane terminated at both molecular chain ends each with a trimethylsilyl groups as expressed by the formula $$Me_3Si-O-SiMe_2-O)_mSiMe_3;$$

a dimethylpolysiloxane terminated at both molecular chain ends each with a silanolic hydroxy group as expressed by the formula $$HO-SiMe_2-O)_nH;$$

a dimethylpolysiloxane terminated at both molecular chain ends each with an alkoxy group, e.g. methoxy or ethoxy group, as expressed by the formula $$MeO-(SiMe_2-O)_pMe \text{ or } EtO-(SiMe_2-O)_qEt;$$

a cyclic dimethylpolysiloxane expressed by the formula

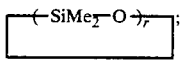

a dimethyl diphenyl polysiloxane terminated at both molecular chain ends each with a trimethylsilyl group as expressed by the formula $$Me_3Si-O-(SiMe_2-O)_s(SiPh_2-O)_tSiMe_3;$$

and a dimethyl methylvinyl polysiloxane terminated at both molecular chain ends each with a trimethylsilyl group as expressed by the formula $$Me_3Si-O-(SiMe_2-O)_u(SiMeVi-O)_vSiMe_3;$$

and alkoxysilane compounds expressed by the formulas:
 MeSi(OMe)$_3$; Me$_2$Si(OMe)$_2$; Me$_3$SiOMe; PhSi(OMe)$_3$;
 PhSi(OEt)$_3$; Ph$_2$Si(OEt)$_2$; ViSi(OMe)$_3$; ViMeSi(OMe)$_2$;
 PrSi(OMe)$_3$; and DdSi(OMe)$_3$, in which the symbols Me, Et, Pr, Dd, Ph and Vi denote methyl, ethyl, propyl, dodecyl, phenyl and vinyl groups, respectively, and the suffixes m, n, p, q, r, s, t, u and v are each a positive integer. These organosilicon compounds may be used either singly or as a combination of two kinds or more according to need as the reactant (a). One of the preferable classes of the organosilicon compounds is the cyclic organopolysiloxane expressed by the formula given above, in which the suffix r has a value of 3 to 10.

The reactant (b) to be reacted with the reactant (a) is a phosphonate ester-modified alkoxysilane compound represented by the general formula (II), in which $R^3$ is a substituted or unsubstituted monovalent hydrocarbon group having from 1 to 20 carbon atoms and may be selected from the class of the groups given above as the examples of the group $R^1$ in the general formula (I), $R^4$ is a divalent hydrocarbon group having from 1 to 8 carbon atoms such as methylene, ethylene, propylene and butylene groups and c is zero, 1 or 2.

Several of the particular examples of the phosphonate ester-modified alkoxysilane suitable as the reactant (b) include those compounds expressed by the following structural formulas:
 (MeO)$_3$SiCH$_2$PO(OMe)$_2$;  (MeO)$_2$MeSiCH$_2$PO(OMe)$_2$;
 (MeO)$_3$SiCH$_2$CH$_2$PO(OMe)$_2$;  (MeO)$_2$MeSiCH$_2$CH$_2$PO(OMe)$_2$;
 (MeO)$_3$SiCH$_2$CH$_2$CH$_2$PO(OMe)$_2$;  (MeO)$_2$MeSiCH$_2$CH$_2$CH$_2$PO(OMe)$_2$;
 (EtO)$_3$SiCH$_2$CH$_2$PO(OMe)$_2$;  (EtO)$_3$SiCH$_2$CH$_2$PO(OMe)$_2$;
 SiCH$_2$CH$_2$CH$_2$PO(OEt)$_2$;  (EtO)$_2$MeSiCH$_2$CH$_2$PO(OEt)$_2$;
 (EtO)$_3$SiCH$_2$CH$_2$CH$_2$PO(OOc)$_2$;  (EtO)$_3$SiCH$_2$CH$_2$CH$_2$PO(ODd)$_2$;
 (EtO)$_2$MeSiCH$_2$CH$_2$CH$_2$PO(ODd)$_2$; and
 (EtO)Me$_2$SiCH$_2$CH$_2$CH$_2$PO(OEt)$_2$, in which Me, Et, Oc and Dd denote methyl, ethyl, octyl and dodecyl groups, respectively.

Such a phosphonate ester-modified alkoxysilane compound can readily be synthesized by the dehydrochlorination reaction between an chloroalkyl alkoxysilane such as 3-chloropropyl trimethoxysilane of the formula (MeO)$_3$SiCH$_2$CH$_2$CH$_2$Cl and a dialkyl phosphonate such as diethyl phosphonate of the formula HPO(OEt)$_2$.

The amount of the phosphonate ester-modified alkoxysilane compound as the reactant (b) in the reaction with the reactant (a) should be in the range from 0.1 to 30 parts by weight per 100 parts by weight of the reactant (a). When the amount thereof is too small, the resultant organopolysiloxane latex may have decreased film-formability as well as decreased bondability to the fabric material treated therewith. When the amount thereof is too large, on the other hand, the stability of the emulsion in the resultant latex is somewhat decreased. It is preferable in conducting the emulsion polymerization according to the invention in order to perform the reaction more efficiently and more uniformly that the phosphonate ester-modified alkoxysilane compound as the reactant (b) is dissolved in advance in the organosilicon compound as the reactant (a) and the thus prepared mixture is then dispersed and emulsified in the aqueous medium containing the specific surface active agent.

The component (c) contained in the aqueous reaction medium for the reaction of the reactants (a) and (b) is a surface active agent which serves to emulsify the reactants (a) and (b) or, rather, the mixture of the reactants (a) and (b) in water. Another role, however, is expected in this component (c) as a catalyst for the reaction of the reactants (a) and (b) so that this component (c) is limited to those of specific types. Namely, the surface active agent as the component (c) should be selected from those of the sulfonic acid type and the sulfate ester type. The sulfonic acid-type surface active agents are usually represented by the structural formula $R^5-C_6H_4-SO_3H$, in which $R^5$ is a monovalent aliphatic hydrocarbon group having at least 6 carbon atoms. The phenylene group $-C_6H_4-$ is preferably a 1,4-phenylene group. Several of the particular examples of the sulfonic acid type surface active agents are those expressed by the following structurel formulas:
 C$_6$H$_{13}$—C$_6$H$_4$—SO$_3$H;  C$_8$H$_{17}$—C$_6$H$_4$—SO$_3$H;
 C$_{10}$H$_{21}$—SO$_3$H;
 C$_{12}$H$_{25}$—C$_6$H$_4$—SO$_3$H; and C$_{14}$H$_{29}$—C$_6$H$_4$—SO$_3$H.

The sulfate ester type surface active agent as an alternative class of the component (c) is represented by the general formula $R^6OSO_3H$, in which $R^6$ is a monovalent organic group having at least 6 carbon atoms. A preferable sulfate ester type surface active agent is a polyoxyethylene derivative of the formula $R^7-O-C_2H_4$-$)_n$OSO$_3$H, in which $R^6$ is a monovalent aliphatic hydrocarbon group having at least 6 carbon atoms or an aryl group substituted with a monovalent aliphatic hydrocarbon group and n is a positive integer from 1 to 15. Several of the particular examples of the sulfate ester type surface active agents are those expressed by the following structural formulas:

C$_8$H$_{17}$—O—C$_2$H$_4$)$_2$OSO$_3$H; and
C$_{10}$H$_{21}$—O—C$_2$H$_4$)$_2$OSO$_3$H.

The sulfate ester type surface active agents are usually available in the form of a salt represented by the general formula $R^6OSO_3M$, in which $R^6$ has the same meaning as defined above and M is an atom of an alkali metal such as sodium and potassium. Particularly preferable examples of the sulfate ester type surface active agent include sodium laurylsulfate and sodium polyoxyethylene dodecylphenylsulfate. Such a surface active agent in the form of a salt is quite satisfactory as such as an emulsifier to give a stable emulsified dispersion of the reactants (a) and (b) in an aqueous medium but it is preferable that the surface active agent in the salt form is subsequently converted into a free acid form by contactiig with a cation exchange resin of H-form so that the reaction of the reactants (a) and (b) can be catalytically accelerated. It is optional that the surface active agents of the sulfonic acid type and the sulfate ester type are used in combination when further improvement is desired in the stability of the emulsion.

The amount of the surface active agent as the component (c) in the aqueous reaction medium should be in the range from 0.5 to 30 parts by weight or, preferably, from 1 to 10 parts by weight per 100 parts by weight of the reactant (a). When the amount of the surface active agent is too small, no stable emulsion can be obtained as a matter of course and the time taken for the polymerization reaction may sometimes be extended. When the amount of the surface active agent is excessively large, on the other hand, the uniformity of the film formed of the latex by drying may be decreased due to the presence of the unnecessarily large amount of the surface active agent or the film thus formed may have poor heat resistance and water resistance although some improvement in the stability of the emulsion can be expected thereby to such an extent that the latex may have a slightly bluish tint.

The reaction of the reactants (a) and (b) is performed in an aqueous meidum containing the surface active agent as the component (c) by emulsifying the reactants therein. The amount of water forming the reaction medium in this case should usually be in the range from 100 to 500 parts by weight per 100 parts by weight of the component (a). The mixture of the reactants and the aqueous medium can readily be emulsified by use of a conventional apparatus for emulsification. A typical procedure for the reaction in an aqueous emulsion is as follows. Thus, the surface active agent as the component (c) is dissolved in a volume of water and the organosilicon compound or, preferably, an organopolysiloxane as the reactant (a) and the phosphonate ester-modified alkoxysilane as the reactant (b), preferably, as a preformed mixture are added to and emulsified in the aqueous solution of the surface active agent under vigorous agitation using, for example, a colloid mill followed by heating of the emulsion for a period from several hours to a week at a suitable temperature in the range from room temperature to 80° C.

As is mentioned before, the surface active agent as the component (c) also serves as a catalyst to accelerate the reaction between the reactants (a) and (b) although, when the catalytic activity of the component (c) is still insufficient, it is optional that the acidity of the mixture under the reaction is further increased by adding a small amount of a strongly acidic compound such as sulfuric acid, hydrochloric acid, trifluoroacetic acid, trifluoromethane sulfonic acid and the like so that the reaction of the reactants can proceed more easily and more rapidly. It is optional that the reaction mixture may be admixed with a non-ionic surface active agent when further increase of the surface activity given by the component (c) is desired so that the condition of emulsion of the reactants (a) and (b) can be further improved. It is also optional that the organopolysiloxane latex of the invention is admixed with other known additives such as coloring agents, antiseptic agents and the like either before or after the reaction in such an amount that no adverse effect is caused on the stability of the emulsion.

The organopolysiloxane latex prepared by the above decribed method of the invention can be used as such in various applications. It is, however, optional that the latex as prepared having acidity is neutralized according to need by use of an alkali such as sodium carbonate, sodium hydroxide, triethanolamine and the like.

The inventive latex of a phosphonate ester-modified organopolysiloxane is useful as a softening agent or feeling improver as well as a binder between fibers of woven and non-woven fabric materials of not only natural and synthetic organic fibers but also inorganic fibers such as glass wools, rock wools and asbestos. In the treatment of the organic fabric materials, the inventive organopolysiloxane latex can advantageously exhibit the desired effect of softening, feeling improvement and binding without decreasing the flame retardancy of the treated fabric materials since the phosphonate ester-modified organopolysiloxane per se can impart flame retardancy to some extent to the organic materials treated with another flame retardant agent. The organopolysiloxane latex of the invention is useful also as a mold-release agent, coating agent on release papers, lustering agent, anti-foam agent, additive of a paint and other coating compositions and the like.

In the following, the phosphonate ester-modified organopolysiloxane latex and the method for the preparation thereof are described in more detail by way of examples.

EXAMPLE 1

Into a glass beaker of 2 liter capacity were introduced 680 g of water and 10 g of dodecylbenzene sulfonic acid to form a uniform aqueous solution, to which a mixture composed of 300 g of octamethylcyclotetrasiloxane and 10 g of a phosphonate ester-modified alkoxysilane of the formula $(EtO)_3Si-CH_2-CH_2-PO(OEt)_2$, in which Et is an ethyl group, was added under vigorous agitation with a high-speed mixer and uniformly dispersed to form a stable aqueous emulsion. The emulsion was heated at 70° C. for 16 hours followed by neutralization by the addition of a small amount of sodium carbonate to give a stable latex of a phosphonate ester-modified organopolysiloxane containing 28% by weight of non-volatile matter after drying at 100° C. for 3 hours and capable of giving a rubbery film when a thin layer thereof was dried.

EXAMPLE 2

Into a glass beaker of 2 liter capacity were introduced 300 g of octamethylcyclotetrasiloxane and 20 g of a phosphonate ester-modified alkoxysilane of the formula $(MeO)_2MeSi-CH_2-CH_2-CH_2-PO(ODd)_2$, in which Me and Dd is a methyl and dodecyl group, respectively, to form a uniform mixture and then an aqueous solution prepared by dissolving 10 g of sodium laurylsulfate in 670 g of water was added thereto under vigorous agitation using a colloid mill to form a stable aqueous emulsion.

Thereafter, the aqueous emulsion was admixed with 50 g of a cation exchange resin (Amberlite 200, a product by Organo Co.) in the H-form and agitated at room temperature for 1 hour followed by filtration to remove the ion exchange resin so that the emulsion was strongly acidified. The thus acidified emulsion was heated at 70° C. for 10 hours followed by neutralization with addition of a small volume of an aqueous solution of sodium carbonate to give a stable aqueous emulsion having a pH of about 7 and containing 29.5% by weight of non-volatile matter after drying at 100° C. for 3 hours and capable of giving a rubbery film somewhat more flexible than that from the latex prepared in Example 1 when dried.

EXAMPLE 3

Into a glass beaker of 2 liter capacity were introduced 300 g of a dimethylpolysiloxane having a viscosity of about 200 centistokes at 25° C. terminated at both molecular chain ends each with a silanolic hydroxy group and 20 g of the same phosphonate ester-modified alkoxysilane as used in Example 2 to form a uniform mixture and then an aqueous solution prepared by dissolving 20 g of sodium laurylsulfate in 640 g of water was added thereto under vigorous agitation using a highspeed mixer to give a uniform emulsion followed by further agitation using a colloid mill to increase the homogeneity of the emulsion.

The thus prepared aqueous emulsion was then admixed with 50 g of the same cation exchange resin in the H-form as used in Example 2 and agitated for 1 hour to be strongly acidified followed by filtration to remove the ion exchange resin. The thus acidified emulsion was heated at 40° C. for 20 hours followed by neutralization with addition of a small volume of a 10% aqueous solution of sodium carbonate to give a stable emulsion containing 29.5% by weight of non-volatile matter after drying at 100° C. for 3 hours.

COMPARATIVE EXAMPLE

The experimental procedure was substantially the same as in Example 2 excepting the omission of the addition of the phosphonate ester-modified alkoxysilane. The thus prepared aqueous emulsion contained 28.5% by weight of non-volatile matter after drying at 100° C. for 3 hours and gave a gum-like film when dried.

APPLICATION EXAMPLE

Each 1 g portion of the latexes prepared in the above described Examples and Comparative Example was diluted with 99 g of water to give a treatment bath in which a piece of a 35:65 mixed-spun broad cloth of polyester and cotton was dipped and then squeezed to give a squeeze ratio of 100%, i.e. an equal weight of the liquid absorbed in the cloth, followed by curing with heating first at 100° C. for 2 minutes and then at 150° C. for 2 minutes. The softness and feeling of the thus treated test specimens and the cloth before treatment were evaluated organoleptically by hand-touching and by measuring using a feeling tester to give the results shown in Table 1 below.

TABLE 1

| Latex prepared in | Softness by feeling tester | Feeling by hand-touching |
|---|---|---|
| Example 1 | 25 | Somewhat resilient |
| Example 2 | 20 | Soft and resilient |
| Example 3 | 22 | Somewhat resilient |

TABLE 1-continued

| Latex prepared in | Softness by feeling tester | Feeling by hand-touching |
|---|---|---|
| Comparative Example | 28 | Deficient in resilience |
| (Untreated) | 35 | No softness, hard and coarse feeling |

What is claimed is:

1. A method for the preparation of an organopolysiloxane latex which comprises:

emulsion-polymerizing (a) 100 parts by weight of an organosilicon compound represented by the general formula $$R^1_a R^2_b SiO_{(4-a-b)/2},$$

in which $R^1$ is a group selected from the class consisting of substituted and unsubstituted monovalent hydrocarbon groups having from 1 to 20 carbon atoms, $R^2$ is an alkoxy group or a hydroxy group, each of the groups denoted by $R^1$ or $R^2$ in a molecule being indepedent from the others, a is a positive number not exceeding 3 and b is zero or a positive number not exceeding 3 with the proviso that a+b is in the range from 1 to 4 inclusive, and (b) from 0.1 to 30 parts by weight of a phosphonate ester-modified alkoxy silane represented by the general formula $$(R^3O)_{3-c}R^3_c Si-R^4-PO(OR^3)_2,$$

in which $R^3$ is a substituted or unsubstituted monovalent hydrocarbon group having from 1 to 20 carbon atoms, each of the groups denoted by $R^3$ in a molecule being independent from the others, $R^4$ is a divalent hydrocarbon group having from 1 to 8 carbon atoms and c is zero, 1 or 2, in an aqueous medium containing (c) a surface active agent selected from the class consisting of the sulfonic acid type having the structural formula $$R^5-C_6H_4-SO_3H,$$

in which $R^5$ is a monovalent aliphatic hydrocarbon group having at least 6 carbon atoms, and the sulfate ester type having the formula $$R^6OSO_3H,$$

in which $R^6$ is a monovalent organic group having at least 6 carbon atoms.

2. The method as claimed in claim 1 wherein the organosilicon compound as the reactant (a) is an organopolysiloxane.

3. The method as claimed in claim 2 wherein the organopolysiloxane is a cyclic dimethylpolysiloxane having a degree of polymerization in the range from 3 to 10.

4. An organopolysiloxane latex comprising an organopolysiloxane modified with at least one phosphonate ester-containing group represented by the general formula $$-Si-R^4-PO(OR^3)_2,$$

in which $R^3$ is a substituted or unsubstituted monovalent hydrocarbon group having from 1 to 20 carbon atoms, each of the two groups denoted by $R^3$ being independent from the other, and $R^4$ is a divalent hydrocarbon group having from 1 to 8 carbon atoms, bonded to the silicon atom of the organopolysiloxane through a siloxane linkage Si—O—Si.

* * * * *